United States Patent Office 2,857,365
Patented Oct. 21, 1958

2,857,365
MANUFACTURE OF LOW MOLECULAR WEIGHT OLEFIN/MALEIC ANHYDRIDE COPOLYMERS

John H. Johnson, Dayton, Ohio, assignor to Monsanto Chemical Company, St. Louis, Mo., a corporation of Delaware No Drawing. Application May 11, 1956
Serial No. 584,175

12 Claims. (Cl. 260—78.5)

This invention relaes to the production of low molecular weight olefin/maleic anhydride copolymers. In some of its aspects the invention pertains to the copolymerization of maleic anhydride with ethylene and/or propylene and/or butene in the presence of particular materials which result in the production of low molecular weight copolymers, particularly ethylene/maleic anhydride copolymers having a specific viscosity not in excess of 0.2 as determined on a solution of one weight per cent of the copolymer in dimethylformamide at 25° C.

Copolymers of maleic anhydride with all sorts of copolymerizable unsaturated organic compounds have been known for many years. It is known to copolymerize maleic anhydride with the lower olefin hydrocarbons, the resulting copolymers containing substantially equimolar proportions of maleic anhydride and the olefin combined therein. The copolymerization is advantageously effected by subjecting a solution of maleic anhydride in an organic diluent, e. g., benzene, to a superatmospheric olefin pressure, employing a peroxide catalyst and elevated temperatures. In many instances where a comparatively high molecular weight copolymer is desired, this procedure is adequate. However, it has been found difficult to produce low molecular weight olefin/maleic anhydride copolymers, which find various uses such as deflocculants and thinners for drilling muds and dispersants for pigments. While especially elevated temperatures, e. g., those above 100° C., tend to result in a product of lowered molecular weight, the physical form is not desirable; it appears that the high temperatures cause a softening of the copolymer product which forms as a more or less insoluble solid in suspension in the diluent or solvent used, and the softened particles of polymer tend to agglomerate, as well as accumulate on the walls of the reaction vessel and stirrer, if any is used. While for many polymerizations an increase in the amount of catalyst causes a decrease in molecular weight of the polymer, this particular system is not very sensitive to catalyst concentration at least insofar as reflected in a change in molecular weight.

In accordance with the present invention in preferred aspects, the copolymerization of maleic anhydride with a $C_2$ to $C_4$ olefin is effected in the presence of a hydrogen phosphite or dihydrogen phosphite. These materials can be generally described as R-dihydrogen phosphites, and di-R-hydrogen phosphites. In the formulae just stated, R is a monovalent hydrocarbon radical. The term "hydrocarbon radical" is used throughout this patent application in its broader sense, in that a particular R group can also contain constituents other than carbon and hydrogen, for example alkoxy, chloro, hetero atoms such as oxygen, etc., and the like which are non-reactive or at least which do not interfere with the desired action of the phosphite containing same at the conditions employed. A compound containing a hydrocarbon radical that is substituted with a non-interfering group is the equivalent, for use in the process of the present invention, of the corresponding compound containing the hydrocarbon radical containing only carbon and hydrogen.

The phosphites employed in the present invention permit the production of ethylene/maleic anhydride copolymers, propylene/maleic anhydride copolymers, and butene/maleic anhydride copolymers having low molecular weights desired for certain purposes, and have marked advantages over certain other types of compounds which also result in the production of low molecular weight copolymers in that the yield is only moderately reduced at a given concentration of catalyst, usually a peroxide, and essentially theoretical yields are readily obtained by only modest increases in the concentration of the catalyst.

In view of the differences in nomenclature frequently found in phosphorus chemistry, and in order to make clear the meaning of the terms used herein, it can be pointed out that the compounds in question are typified as follows, wherein R represents an alkyl group:

Alkyl dihydrogen phosphite $ROPO_2H_2$
Dialkyl hydrogen phosphite $(RO)_2POH$

By way of example, but not limitation, of suitable hydrogen phosphites, i. e., monohydrogen phosphites and dihydrogen phosphites, that can be employed in practicing the present invention, there are mentioned: dimethyl hydrogen phosphite, diethyl hydrogen phosphite, di-n-propyl hydrogen phosphite, di-isopropyl hydrogen phosphite, di-t-butyl hydrogen phospite, di-n-butyl hydrogen phosphite, di-sec-butyl hydrogen phosphite, di-isobutyl hydrogen phosphite, the various diamyl hydrogen phosphites, dioctyl hydrogen phosphites, e. g., di-2-ethylhexyl hydrogen phosphite, di-dodecyl hydrogen phosphite, etc., the corresponding monoalkyl (i. e., methyl, ethyl, etc.) dihydrogen phosphites, bis-$\beta$-chloroethyl hydrogen phosphite, bis-($\beta,\beta'$-dichloroisopropyl) hydrogen phosphite, cyclohexyl dihydrogen phosphite, di-methylcyclopentyl hydrogen phosphite, diphenyl hydrogen phosphite, ditolyl hydrogen phosphite, dibenzyl hydrogen phosphite, di-(diisopropylphenyl) hydrogen phosphite, phenyl dihydrogen phosphite, ethyl methyl hydrogen phosphite, isobutyl n-amyl hydrogen phosphite, etc. There is usually no advantage in the phosphites having more than 24 carbon atoms per molecule, and those having from 1 to 12 carbon atoms per molecule are preferred.

The quantity of the particular phosphite employed will fall within a rather wide range. A preferred range is from 0.5 to 10 mole percent of the phosphite, based on the reacting monomers (assuming 100% conversion), i. e., from 0.5 to 10 moles of the phosphite per 50 moles maleic anhydride charged (50 moles maleic anhydride will theoretically react with 50 moles of the olefin, thus making 100 moles of "reacting monomers"). The same basis is meant herein when mole percent catalyst is mentioned. At otherwise fixed reaction conditions, the higher the percentage of phosphite the lower the molecular weight of the resulting copolymer. The amount of phosphite used in one of several interdependent reaction variables which affect the molecular weight of the product. The more important of the other such variables are the reaction temperature and the reaction pressure (upon which the hydrocarbon monomer concentration depends). In general, the higher the temperature, the lower the molecular weight, and the higher the pressure, the higher the molecular weight. However, the temperature should not be increased too much for the reasons discussed hereinabove. Also, the pressure should not be lowered too much or the yield of copolymer tends to decrease to an undue extent. Lower pressures are more suitable in the cases of propylene and isobutylene copolymers. I prefer to employ a reaction temperature within the range of 40 to 80° C., and 60 to 80° C. is especially advantageous. At such temperatures, the reaction rate is good and the physical form of the copolymer product is good. The reaction pressure can be atmospheric or below, but is preferably superatmospheric. It is preferred that the reaction be carried out in a closed vessel such as a stirred autoclave, rocking bomb, tubular reactor through which reaction mixture flows, or the like, at a pressure above atmospheric pressure. The pressure is preferably above 100 pounds per square inch gauge for the preparation of ethylene/maleic anhydride copolymers, and pressures of 150 to 400 pounds per square inch gauge are especially preferred. However, even higher pressures, say up to 1000 pounds per square inch gauge and above, are permissible. As pointed out hereinafter, in general, the higher the pressure the higher the molecular weight and hence the greater the quantity of phosphite required.

The olefin reactant can be a single olefin or a mixture of any two or more of the olefins ethylene, propylene, isobutylene, butene-1, butene-2-cis, and butene-2-trans. Preferred olefins are ethylene, propylene and isobutylene. While the maleic anhydride copolymers of these olefins have many attributes in common, there are also important differences among the products as well as among the optimum ranges of reaction conditions to be employed in making them. Thus reaction pressures can be significantly lower when higher boiling olefin monomers are used. For example, adequate olefin monomer concentration can be obtained at pressures ranging from 50–200 p. s. i. when propylene is involved; with isobutylene, essentially atmospheric pressures are sufficient, but higher pressures can be used. The properties of the copolymers differ markedly with the olefin monomer with particular reference to acid strength of the copolymers which have been hydrolyzed to the free acid form and chemical reactivity of both the anhydride and the acids. In general, the greater the degree of substitution on the ethylene group, the lesser are both acid strengths and chemical reactivity (i. e., ease of esterification, etc.).

The invention will be discussed in more detail referring to ethylene/maleic anhydride copolymers by way of example, and application of same to the other olefins will be apparent, bearing in mind the foregoing comments.

The copolymer product contains essentially one mole of total olefin per one mole of maleic anhydride combined therein, irrespective of the relative proportions of ethylene or other olefin or mixture of olefins on the one hand, and maleic anhydride on the other hand, introduced to the reaction system. The ratio of free olefin, e. g., ethylene, available for reaction, to free maleic anhydride available for reaction, at any given time depends upon a variety of factors, including particularly the quantity of free maleic anhydride dissolved in the solvent. The latter value in turn depends upon the solubility of ethylene in the reaction mixture, which is a function of the particular solvent, the temperature, the pressure, and the concentration of maleic anhydride in the solvent. It is much preferred that by the time the reaction has been completed, an excess of ethylene over that required to react with the entire quantity of maleic anhydride shall have been furnished to the reaction mixture, so as to give maximum utilization of the maleic anhydride. Any unreacted ethylene is readily recovered and recycled to the reaction. The ethylene, maleic anhydride, solvent or diluent, and phosphite can be brought together in various ways, but in any event thorough intermixture of same should be provided. Thus, the reaction can be conducted in a batch, into which ethylene is continuously or intermittently added to maintain pressure until all the maleic anhydride is used up by copolymerization. A similar operation can be conducted wherein maleic anhydride is added continuously or intermittently. The components of the reaction mixture can be continuously fed into a stirred autoclave with continuous overflow of total reaction mixture out of the autoclave either to recovery steps or through a series of autoclaves. A total reaction mixture can be passed through an elongated reaction tube, with ethylene and/or maleic anhydride and/or catalyst and/or phosphite being added at one or more points along the length of the tube if desired.

It is most convenient to carry out the reaction in the presence of an organic solvent for the maleic anhydride. Such solvent is preferably also a non-solvent for the copolymer product. Such materials, which can be termed solvents or diluents, are advantageously aliphatic or aromatic hydrocarbons or chlorinated hydrocarbons, for example, benzene, toluene, xylene, n-hexane, mixed hexanes, octane, ethylene dichloride, propylene dichloride, chlorobenzene, the dichlorobenzenes, and the like. Since the solvent preferably has a high capacity for dissolving maleic anhydride, it is desirable when a poor solvent for maleic anhydride, such as hexane, is employed to have mixed therewith a good solvent for maleic anhydride, such as ethylene dichloride or benzene. While the proportion of the total solvent to the other components of the reaction mixture can be varied over a wide range, it is preferred to employ an amount such that the final reaction mixture will have a solids content (copolymer plus any unreacted maleic anhydride) within the range of 5 to 30 weight percent.

The copolymerization is effected in the presence of a catalyst of free-radical promoting type, principal among which are peroxide-type polymerization catalysts and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR'', wherein R' is an organic radical and R'' is an organic radical or hydrogen. These compounds are broadly termed peroxides, and in a more specific sense are hydroperoxides when R'' is hydrogen. R' and R'' can be hydrocarbon radicals or organic radicals substituted with a great variety of substituents. By way of example, suitable peroxide-type catalysts include: benzoyl peroxide, lauroyl peroxide, tertiary butyl peroxide, 2,4-dichlorobenzoyl peroxide, tertiary butyl hydroperoxide, diacetyl peroxide, diethylperoxycarbonate, dimethylphenylhydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N— wherein the indicated valences can be attached to a wide variety of organic radicals, at least one, however, preferably being attached to a tertiary carbon atom. By way of example of suitable azo-type catalysts can be mentioned $\alpha,\alpha'$-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p - tolyldiazoaminobenzene. The peroxy type or azo type or other free radical promoting type of polymerization catalyst is used in small but catalytic amounts, which generally are not in excess of 1 to 2 mole percent based on the reacting monomers as above defined. A suitable quantity is often in the range of 0.1 to 1.0 mole percent.

It is an important advantage of the present invention that the phosphites, while quite active in reducing the molecular weight of the copolymer product, do not seem to stop the chain transfer reaction to a severe extent and hence even with comparatively large amounts of the added phosphite, it is necessary to increase the catalyst concentration only a very moderate amount. Further information is supplied in the examples given hereinafter.

The quantity of the R dihydrogen phosphite or di-R hydrogen phosphite employed will be chosen which, in combination with the other reaction variables, will result in the production of an ethylene/maleic anhydride copolymer having a specific viscosity less than that obtained if the phosphite is not used. In general, the specific viscosity should be not in excess of about 0.3, as determined on a one weight percent solution of the copolymer product in dimethylformamide, the viscosity measurement being made at 25° C. The preferred range of specific viscosities for ethylene/maleic anhydride copolymers is from 0.05 to 0.2, and a value of less than 0.15 is preferred for most uses to which the copolymer may be put. Since there are certain inherent viscosity differences depending upon the olefin employed, the preferred range of specific viscosities for the phosphite regulated copolymers will vary. This is due to the effects of olefin substitution upon the degree of coiling for the polymer chain which results in varying solution viscosities for different polymers of equivalent molecular weights. Thus, the preferred specific viscosity range for propylene/maleic anhydride copolymer is from 0.10 to 0.40 and for isobutylene/maleic anhydride copolymer from 0.20 to 1.0. To obtain polymers having these specific viscosities, the amount of phosphite employed will in most cases be within the range of 0.1 to 10 mole percent based on reacting monomers as hereinabove defined. The phosphite appears to enter into chemical combination with the polymer, one molecule of phosphite being incorporated with each polymer molecule. Any unreacted phosphite remaining present in the final reaction mixture can be recovered and returned to the process for further use.

The commercial form of maleic anhydride is satisfactory for use in the present invention. Where exposure to moisture has occurred and the maleic anhydride is contaminated with maleic acid, it is preferred to dissolve the material in the solvent to be used in the reaction, and separate by filtration or centrifuging or otherwise any maleic acid present, which is not dissolved by the solvent. In other words, a maleic acid-free reaction mixture is preferred. As pointed out before, the copolymer product generally separates as a solid insoluble in the reaction mixture. It can be separated therefrom by centrifuging or filtration as desired, and then is preferably washed with a hot organic solvent for maleic anhydride, such as benzene at 100° F., sufficiently to remove any unreacted maleic anhydride from the copolymer product. The copolymer is then subjected to any conventional drying procedure to remove any residual solvent. As an alternate procedure for isolation, the polymer slurry can be direct dried in a vacuum-pan drier.

The low molecular weight olefin/maleic anhydride copolymers produced by the practice of the present invention find particular use as dispersants in numerous industrial fields. They have been found to be outstanding in their ability to thin drilling muds, i. e., aqueous suspensions of clay or other finely divided inorganic solids used in the drilling of oil wells. The low molecular weight copolymers are also dispersants for inorganic pigments, for clay slips used in the ceramics industry, for clay coatings for paper, and the like. The copolymer can be employed as such, i. e., in the anhydride form, and hydrolysis to the free acid or salt, if salt-forming materials are present, occurs in the aqueous medium in which the polymer is being used. Alternatively, the copolymer before use can first be converted to the free acid form by hydrolysis, or to the form of its alkali metal or other metal salts, ammonium salts, amine salts, partial or complete ester or amide, and the like, as may be desired for any particular purpose.

The following examples are provided to give an indication of suitable reactants, solvents, catalysts, and phosphite, and proportions of same, as well as suitable temperature and pressure conditions for the copolymerization. However, it will be understood that variations from these specific examples can be made without departing from the invention.

EXAMPLE 1

The procedure and apparatus described in this control example were also used in all of the other examples.

A three-liter rocking autoclave was charged with 200 grams maleic anhydride dissolved in 1600 cc. reagent grade thiophene-free benzene, plus 4.96 grams benzoyl peroxide (0.5 mole percent, based on reacting monomers). The autoclave bomb was pressured to 100 pounds per square inch gauge (p. s. i. g.) with ethylene, rocked at room temperature for 10 minutes, and the ethylene then vented. This was twice more repeated. By this flushing procedure the reaction mixture was freed of any dissolved air. The bomb was then charged with sufficient ethylene to give an estimated 200 p. s. i. g. pressure on heating to the chosen reaction temperature of 70° C.

Rocking of the bomb was started, and the temperature brought up to 70° C. by means of an electrically heated jacket. Additional ethylene was charged into the bomb from time to time to maintain the bomb pressure at approximately 200 p. s. i. g. In most of the examples the run continued overnight so that the total time was 20 to 24 hours; however, the copolymerization reaction was completed in less than this time.

Unreacted ethylene was vented, the total reaction mixture filtered, the separated ethylene/maleic anhydride copolymer washed several times with benzene while filtering, and the polymer was then dried at 100° C. for 24 hours under the full vacuum of a water aspirator. Yield of polymer was calculated as percent of theory, based on 100% of the maleic anhydride being copolymerized with ethylene in 1:1 mole ratio.

The specific viscosity of this polymer, as well as that of the other polymers reported in the following examples, was determined by modification of ASTM method D–445–46T, method B, using an Ostwold type viscosimeter. The polymer was dissolved in 1 weight percent concentration in dimethylformamide, and the specific viscosity determined at 25° C.

The specific viscosity of the polymer produced in this example was 0.36. Yield was 99.3%.

EXAMPLES 2 TO 7 INCLUSIVE

In exactly the manner described in Example 1, under the same temperature and pressure conditions (with one exception as to pressure indicated below), and with the same quantities of maleic anhydride and benzene (benzene varied from 1560 cc. to 1600 cc.), and with the same flushing reaction technique, and workup procedure for recovering final polymer product, polymerizations were carried out in the presence of varying quantities of dibutyl hydrogen phosphite and benzoyl peroxide. The pertinent data, including the specific viscosity of the ethylene/maleic anhydride copolymer products made in the presence of dibutyl hydrogen phosphite, are given in the following table.

*Effect of varying proportions of dibutyl hydrogen phosphite and peroxide catalyst on molecular weight (expressed as specific viscosity) of ethylene/maleic anhydride copolymer*

| Example No. | Reaction Temp., °C. | Reaction Pressure, p. s. i. g. | Benzoyl Peroxide, Mole Percent [1] | Dibutyl Hydrogen Phosphite, Mole Percent [1] | EMA Copolymer | |
|---|---|---|---|---|---|---|
| | | | | | Yield, Percent [2] | Sp. Vis. |
| 2 | 70 | 200 | 0.5 | 0.31 | 97.5 | 0.31 |
| 3 | 70 | 200 | 0.5 | 0.50 | 96.9 | 0.27 |
| 4 | 70 | 100 | 0.5 | 0.50 | 60.7 | 0.16 |
| 5 | 70 | 200 | 0.5 | 5.0 | 86.0 | 0.20 |
| 6 | 70 | 200 | 0.5 | 5.0 | 74.0 | 0.19 |
| 7 | 70 | 200 | 1.0 | 5.0 | 98.2 | [3] 0.16 |

[1] Based on reacting monomers.
[2] Percent of theory.
[3] This copolymer analyzed 0.22% phosphorus, indicating a molecular weight of about 14,000 if it is assumed each polymer molecule contains one phosphorus atom.

It will be seen from the foregoing data, as compared with the data in the control Example 1, that the use of even a small quantity of dibutyl hydrogen phosphite in the polymerization reaction mixture caused a marked decrease in the molecular weight of the polymer product as expressed in terms of specific viscosity. Thus, Examples 2 and 3 respectively employing 0.3 and 0.5 mole percent dibutyl hydrogen phosphite, gave specific viscosities of 0.31 and 0.27, respectively, compared with 0.36 for the control, all of these employing the same quantity of benzoyl peroxide catalyst (0.5 mole percent). Example 4, however, which employed the same quantity of benzoyl peroxide and dibutyl hydrogen phosphite as Example 3, resulted in a much lower molecular weight polymer, having a specific viscosity of 0.16. This is a direct result of the lowering of the reaction pressure from 200 p. s. i. g. to 100 p. s. i. g. However, it will also be noted that the polymer yield dropped sharply from practically the theoretical yield to 60 percent. Examples 5 and 6 were carried out again at 200 p. s. i. g., with ten times the quantity of dibutyl hydrogen phosphite, i. e., 5 mole percent. The result was the production of a low molecular weight copolymer (specific viscosity 0.2), but the yield of polymer in these approximate duplicate runs was 86 and 74 percent, respectively. However, keeping the proportions of materials and conditions just the same, i. e., 70° C., 200 p. s. i. g., and 5.0 mole percent dibutyl hydrogen phosphite, but increasing the benzoyl peroxide content from 0.5 to 1.0 mole percent resulted (Example 7) in again bringing the yield up to essentially theoretical while still producing the desired low molecular weight polymer (specific viscosity 0.16). The amount of catalyst required in this Example 7 was still low, viz., only one percent.

All of the ethylene/maleic anhydride copolymers of Examples 2–7 are excellent thinners and deflocculants for aqueous base oil well drilling muds when added thereto at the rate of from 1 to 4 pounds of copolymer per 42-gallon barrel of mud.

While the invention has been described with particular reference to various preferred embodiments thereof, it will be appreciated that numerous modifications and variations are possible without departing from the invention in its broadest aspects.

I claim:

1. In the copolymerization of maleic anhydride with an olefin having from 2 to 4 carbon atoms in the presence of a free radical promoting catalyst to form an olefin/maleic anhydride copolymer, the improvement which comprises effecting said copolymerization in the presence of a compound selected from the group consisting of R-dihydrogen phosphites and di-R-hydrogen phosphites wherein R is a monovalent hydrocarbon radical.

2. In the copolymerization of maleic anhydride with ethylene in the presence of a free radical promoting catalyst to form ethylene/maleic anhydride copolymer, the improvement which comprises effecting said copolymerization in the presence of a compound selected from the group consisting of R-dihydrogen phosphites and di-R-hydrogen phosphites wherein R is a monovalent hydrocarbon radical.

3. In the copolymerization of maleic anhydride with propylene in the presence of a free radical promoting catalyst to form propylene/maleic anhydride copolymer, the improvement which comprises effecting said copolymerization in the presence of a compound selected from the group consisting of R-dihydrogen phosphites and di-R-hydrogen phosphites wherein R is a monovalent hydrocarbon radical.

4. In the copolymerization of maleic anhydride with isobutylene in the presence of a free radical promoting catalyst to form isobutylene/maleic anhydride copolymer, the improvement which comprises effecting said copolymerization in the presence of a compound selected from the group consisting of R-dihydrogen phosphites and di-R-hydrogen phosphites wherein R is a monovalent hydrocarbon radical.

5. In the copolymerization of ethylene with maleic anhydride in the presence of a free radical promoting catalyst to form an ethylene/maleic anhydride copolymer, the improvement which comprises effecting said copolymerization in the presence of a dialkyl hydrogen phosphite.

6. In the copolymerization of ethylene with maleic anhydride in the presence of a free radical promoting catalyst to form an ethylene/maleic anhydride copolymer, the improvement which comprises effecting said copolymerization in the presence of an alkyl dihydrogen phosphite.

7. In the copolymerization of ethylene with maleic anhydride in the presence of a free radical promoting catalyst to form an ethylene/maleic anhydride copolymer, the improvement which comprises effecting said copolymerization in the presence of dibutyl hydrogen phosphite.

8. A process which comprises subjecting maleic anhydride maintained under an ethylene pressure of at least 200 pounds per square inch and at a temperature within the range of 40 to 80° C. to polymerization with the aid of a peroxide catalyst present in an amount of at least 1 mole percent based on the reacting monomers plus a phosphite selected from the group consisting of R-dihydrogen phosphites and di-R-hydrogen phosphites wherein R is a monovalent hydrocarbon radical present in an amount of at least 5 mole percent based on the reacting monomers, continuing said polymerization conditions until essentially all the maleic anhydride has been copolymerized with ethylene, and recovering as a product of the process an ethylene/maleic anhydride copolymer in essentially theoretical yield and having a specific viscosity as determined in 1 weight percent solution in dimethylformamide at 25° C. of not in excess of 0.2.

9. A process according to claim 8 in which said peroxide is benzoyl peroxide.

10. A process according to claim 8 in which said phosphite is dibutyl hydrogen phosphite.

11. A process according to claim 8 in which said copolymerization is effected in the presence of an aromatic hydrocarbon diluent.

12. A process according to claim 11 wherein said diluent is benzene.

References Cited in the file of this patent

UNITED STATES PATENTS

| | | |
|---|---|---|
| 2,378,629 | Hanford | June 19, 1945 |
| 2,396,785 | Hanford | Mar. 19, 1946 |
| 2,543,635 | Loritsch | Feb. 27, 1951 |